US008483561B2

(12) United States Patent
Trojer

(10) Patent No.: US 8,483,561 B2
(45) Date of Patent: Jul. 9, 2013

(54) REMOTE POWERING FOR FTTX VIA EXISTING WIRE

(75) Inventor: Elmar Trojer, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 328 days.

(21) Appl. No.: 12/867,099

(22) PCT Filed: Feb. 11, 2008

(86) PCT No.: PCT/SE2008/050159
§ 371 (c)(1),
(2), (4) Date: Aug. 11, 2010

(87) PCT Pub. No.: WO2009/102243
PCT Pub. Date: Aug. 20, 2009

(65) Prior Publication Data
US 2010/0310255 A1    Dec. 9, 2010

(51) Int. Cl.
*H04J 14/00* (2006.01)
(52) U.S. Cl.
USPC .......................................................... 398/66
(58) Field of Classification Search
USPC .......................................................... 398/66
See application file for complete search history.

(56) References Cited

U.S. PATENT DOCUMENTS

| 5,325,223 | A | 6/1994 | Bears |
| 5,729,370 | A | 3/1998 | Bernstein et al. |
| 6,760,847 | B1 * | 7/2004 | Liu et al. ................... 713/300 |
| 2003/0123648 | A1 * | 7/2003 | Ashton et al. ............... 379/403 |
| 2004/0165889 | A1 | 8/2004 | Mahony et al. |
| 2006/0039402 | A1 | 2/2006 | Ross |
| 2006/0113843 | A1 | 6/2006 | Beveridge |
| 2008/0158920 | A1 * | 7/2008 | Hastings et al. ............. 363/60 |
| 2009/0086977 | A1 * | 4/2009 | Berggren ................... 380/279 |

FOREIGN PATENT DOCUMENTS

WO    WO 9318605 A1    9/1993

OTHER PUBLICATIONS

Pupillo L, et al: "The economics of local loop architecture for multimedia service." Information Economics and Policy, vol. 10, No. 1, pp. 107-126. XP027303523. Mar. 1, 1998. North-Holland, Amsterdam, NL.
"General characteristics" G984.1 Gigabit-capable Passive Optical Networks (GPON). ITU-T. Mar. 2003.
"Physical Media Dependent (PMD) layer specification." G984.2 Gigabit-capable Passive Optical Networks (GPON). ITU-T. Mar. 2003.

(Continued)

*Primary Examiner* — Shi K Li

(57) ABSTRACT

The present invention relates to a powering method, a powering system, a cabinet and a central office for powering a copper-centric fiber to the x (FTTX) architecture. The architecture comprises at least one point to point or point to multipoint optical distribution network (ODN) between an optical line termination (OLT) or first Ethernet Switch positioned at a central office (CO) and an optical network unit or second Ethernet switch positioned at a cabinet (CAB) or building closer to a network terminal (CPE). The ODN is an active or passive network. The architecture further comprises at least one signalling coaxial or twisted wire pair line between the ONU or second Ethernet switch (ES) and one network terminal (CPE). What particularly characterizes the present invention is that the ONU or the second ES is powered remotely from the central office (CO) via at least one powering twisted wire pair line extending between the central office (CO) and the cabinet (CAB) or building.

22 Claims, 11 Drawing Sheets

OTHER PUBLICATIONS

"Industry best practice for 2.488 Gbit/s downstream 1.244 Gbit/s upstream." G984.2 Amendment 1, New Appendix III. ITU-T. Feb. 2006.

"Transmission convergence layer specifications." G984.3 Gigabit-capable Passive Optical networks (GPON). ITU-T. Feb. 2004.

Pesavento, et al. "IEEE 802.3ah" EPON Standard. Jul. 9-11, 2002. Chitose, Japan.

"Asymmetric Digital Subscriber Line (ADSL) transceivers—Extended bandwidth ADSL2 (ADSL2+)" G992.5, ITU-T. Jan. 2005.

"Very high speed digital subscriber line transceivers 2 (VDSL2)," G993.2, ITU-T, Feb. 2006.

* cited by examiner

| Characteristics | EPON | BPON | GPON |
|---|---|---|---|
| Standard | IEEE 802.3ah, | ITU-T G.983 | ITU-T G.984, Ref. |
| Protocol | Ethernet | ATM | ATM/Ethernet |
| Rates (Mbps) | 1244 up / 1244 down | 622/1244 down 155/622 up | 1244/2488 down 155 to 2488 up |
| Span (km) | 10 | 20 | 20 |
| Number of splits | 16 | 32 | 64 |

FIG 3

REMOTE POWERING FOR FTTX VIA EXISTING WIRE

TECHNICAL FIELD

The present invention relates to a powering method, a powering system, a cabinet and a central office for powering a copper-centric fiber to the x (FTTX) architecture.

BACKGROUND

There is an increased interest in fiber-based access technologies. One reason for that is a growing demand for higher speeds in the access network (100 Mbps per user) to enable triple play (services such as voice, video, data, High Definition Television (HDTV) and interactive gaming). Other reasons are the higher competition that network operators are faced today on the broadband market and the price erosion on optical components. Several operators are considering deploying, or actually started to deploy different forms of fiber access network systems.

Fiber To The x (FTTX) is a generic term for any network architecture that uses optical fiber to replace all or part of the usual wire (normally copper wire) local loop used for telecommunications. As shown in FIG. 1, depending on how far the fiber is pulled toward the user, different scenarios are distinguished. These are fiber to the node or the cabinet (FTTN/FTTCab), fiber to the curb or the building (FTTB/FTTC) and fiber to the home (FTTH). These are the abbreviations in FIG. 1:
- HN—Home Network
- AN—Access Network
- UNI—User Network Interface
- SNI—Service Node Interface
- ONU—Optical Network Unit
- ONT—Optical Network Termination
- OLT—Optical Line Termination
- NT—Network Termination
- CP—Customer Premises
- CO—Central Office FTTCab A first step in replacing copper with fiber is to place a cabinet in the vicinity of the user to shorten the copper distance and thereby allowing higher-rate DSL transmission modes like VDSL2 (Very high speed Digital Subscriber Line). Today rate-limited ADSL2+ (Asymmetric DSL) technology is widely deployed to span long distances between the central office (point of present) and the user premises.

FTTB/C

In case the fiber is pulled towards the building/business or curb (multi-dwelling units, business parks), a very short copper-length (house wiring) has to be bridged by DSL (fiber to the building/business FTTB and fiber to the curb FTTB), see 1. The rational behind this kind of architecture is that fiber deployment becomes more expensive, the closer it reaches towards the user.

FTTH

In case copper is totally replaced by fiber from the central office to the user (fiber to the home FTTH) the migration to all-optical access finished, see FIG. 1.

FTTB/C/Cab architectures are copper-centric since they still use parts of the copper line to bridge the very-last mile, whereas FTTH is called fiber-centric since no copper is involved. One main technologies used for these scenarios is VDSL2, used in FTTCab, FTTC and in some FTTB deployments. Another is Gigabit Passive Optical Network (PON) or Ethernet PON backhaul, used in FTTcab, FTTB, FTTC and FTTH. PON will be described later.

VDSL2 (Very High Speed Digital Subscriber Line 2) is an access technology that exploits the existing infrastructure of copper. It can be deployed from central offices, from fiber-fed cabinets located near the customer premises, or within buildings. VDSL2 is the newest and most advanced standard of digital subscriber line (DSL) broadband wireline communications and is designed to support the wide deployment of Triple Play services. VDSL2 enables operators and carriers to gradually, flexibly, and cost-efficiently upgrade existing xDSL-infrastructure.

For FTTB/C/Cab and FTTH the optical network can consist either of a point to point network (active Ethernet) or a point to multipoint network (PON).

For FTTB/FTTC/FTTCab active equipment needs to be installed between the central office and the user premises in order to convert between fiber-transmitted optical signals and wire-transmitted electrical signals. Such active equipments will be described later. For FTTB, the equipment can be powered directly via house power lines whereas for FTTC and FTTCab power need to be provided by new installation.

The bit rate performance and coverage over time of copper and fiber centric FTTx evolution path differs. In a copper-centric solution positive outcomes are that wire is reused, the time to market is reduced and it is progressive with DSL innovation. Negative outcomes are many small nodes and risk against fast bandwidth evolution. In a fiber-centric solution positive outcomes are scalability in capital and operational expenditures, CO consolidation and bandwidth evolution. Negative outcomes are upfront civil works, longer time to market and cabling in buildings.

In a rehab scenario the copper-centric path includes an intermediate step via VDSL2 to provide services in the area of 50 Mbit/s with short time-to-market and reduces capital expenditures compared to the fiber-centric infrastructure. Clearly for greenfield, FTTH is the most economical choice. Most operators investing in FTTx are interested in an FTTCab solution due to cost reasons.

Optical networks can be split into two families depending on the whether the Optical Distribution Network (ODN), i.e. the fiber network between the Optical Line Termination (OLT) at the central office and the Optical Network Termination (ONT) in case of FTTH or Optical Network Unit (ONU) in case of FTTB/C/Cab close to the user, contains active equipment or not. See FIG. 1. In case the ODN is totally passive, the system is called passive optical network (PON) and mainly exist in a point to multipoint (p2 mp) architecture. Points to point (p2p) structures are also available (fiber-based Ethernet) which are active.

In order to operate PON, optical splitters (see FIG. 2) are used to enable a single optical fiber to serve multiple premises, typically splitted into 32 or 64 fibers depending on the manufacturer. Such a splitter cannot provide any switching or buffering capabilities. For PON, the ONU/ONT must perform some kind of special functions, such as (due to the absence of switching capability) broadcasting each signal leaving the OLT to all users served by that splitter. Moreover, since the splitter cannot perform buffering, each individual ONT must be coordinated in a multiplexing scheme to prevent signals leaving the customer from colliding at the intersection.

In comparison with active optical networks, PON has some advantages. They avoid the complexities involved in keeping electronic equipment operating outdoors, for instance caused by the need for powering. They also allow for analog broadcast which can simplify the delivery of analog television. A disadvantage is that the central office must contain the OLT, which is a particular powerful piece of transmitting equipment.

PONS have gained great attention in the last years due to the low cost (p2 mp implies a fiber-frugal tree-topology), maintenance (no remote powering in the FTTH configuration) and failsafe performance advantages (high meantime between failure, no active parts).

The fundamental architecture of a PON system is shown in FIG. 2. Some of the abbreviations have been explained in connection to FIG. 1. Other abbreviations are:

NE—Network Element providing additional services over the same ODN (fe cable-TV video overlay option) on a different wavelength in addition to GPON, OLT and the ONU.
AF—Adaptation Function
S—Point on the optical fiber just after the OLT/ONU (downstream/upstream) optical connection point.
R—Point on the optical fiber just before the OLT/ONU (downstream/upstream) optical connection point.
Tref/Vref—Reference points.
A/B—Points used if WDM-overlay is used.
OS—Optical Splitter
ANSMF—Access Network System Management Functions.
SNF—Service Node Function The OLT broadcasts data downstream to all ONU/Ts via the ODN using Time Division Multiplexing (TDM). In the upstream, different ONU/Ts are using granted timeslots to communicate data to the OLT via a Time Division Multiple Access (TDMA) scheme controlled by the OLT. Upstream and downstream are separated on different wavelengths. Video-overlay on a separate wavelength (Wavelength Division Multiplying WDM) is a supported feature by most PONS. The ODN consist of a common trunk fiber, the passive power splitter (OS) forking up to different users, and user-individual drop-fibers. The splitter is mostly placed in the field at a remote node (RN).

There are currently three alternative PON implementation schemes, the three major ones being Ethernet PON (EPON), broadband PON (BPON), and gigabit PON (GPON), see FIG. 3. All of these follow the topology shown in FIG. 2 but differ clearly in their transmission protocols and performance. As can be seen, GPON as a successor of BPON is the most advanced system in terms of protocol support, the rates (2488 Mbps down and 1244 Mbps up in practical systems), the total span (trunk plus drop span) and the number of users per OLT (split-ratio).

In case a FTTC or FTTCab solution is chosen, new small street-side cabinets need to be installed including the ONU. These cabinets typically hold the following components:

ONU (GPON) or Ethernet Switch (Active Ethernet): Terminating the fiber feed towards the central office.
IPDSLAM (VDSL2 or ADSL2+) and main distribution frame (MDF): Copper connection panel and access multiplexer.
Power unit: Power for the fiber/copper transmission equipment.

Powering an FTTCab solution is one of the main cost drivers for this kind of deployment options. Since a high number of cabinets need to be newly installed, power is mostly not available and need to be encompassed. A typical cabinet supports from 12 to 96 users whereas a classical central offices is serving from 1000 to 10000 users, a difference of two orders of magnitude. The costs for cabinets including equipment and installation have to be traded-off against the gain that is achieved by re-using the copper in the very-last mile. Cabinet equipment also needs to be hardened (higher temperature range, no cooling). Thus low-cost cabinets are vital for FTTCab to be a successful option.

A lot of resources have been invested to design VDSL2 equipment, which main potential field of application is the combination with optical backhaul in an FTTCab solution. To compete with fiber-centric FTTx options, the solution has to be cost efficient.

SUMMARY

The object of the present invention is therefore to provide a cost-efficient solution for powering FTTCab and FTTC that does not depend on local power resources.

In order to solve the above mentioned object the present invention relates to a powering system for a copper-centric fiber to the x (FTTX) architecture. The architecture comprises at least one point to point or point to multipoint optical distribution network (ODN) between an optical line termination (OLT) or first Ethernet Switch (ES) positioned at a central office (CO) and an optical network unit or second Ethernet switch (ES) positioned at a cabinet (CAB) or building closer to a network terminal (CPE). The ODN is an active or passive network. The architecture further comprises at least one signalling coaxial or twisted wire pair line between the ONU or second Ethernet switch (ES) and one network terminal (CPE).

What particularly characterizes the powering system is that the ONU or the second ES is powered remotely from the central office (CO) via at least one powering twisted wire pair line extending between the central office (CO) and the cabinet (CAB) or building.

In order to solve the above mentioned object the present invention also relates to a powering method for a copper-centric fiber to the x (FTTX) architecture. The architecture comprises at least one point to point or point to multipoint optical distribution network (ODN) between an optical line termination (OLT) or first Ethernet Switch (ES) positioned at a central office (CO) and an optical network unit or second Ethernet switch (ES) positioned at a cabinet (CAB) or building closer to a network terminal (CPE). The ODN is an active or passive network. The architecture further comprises at least one signalling coaxial or twisted wire pair line between the ONU or second Ethernet switch (ES) and one network terminal (CPE).

What particularly characterizes the powering method is at least one main power supply (MPS) provided in the central office (CO) powering the ONU or the second ES remotely via at least one powering twisted wire pair line extending between the central office (CO) and the cabinet (CAB) or building. Furthermore, at least one main power receiver provided in the cabinet (CAB) or building receives the remote power.

In order to solve the above mentioned object the present invention further relates to a central office (CO) for a copper-centric fiber to the x (FTTX) architecture. The architecture comprises at least one point to point or point to multipoint optical distribution network (ODN) between an optical line termination (OLT) or first Ethernet Switch (ES) positioned at the central office (CO) and an optical network unit or second Ethernet switch (ES) positioned at a cabinet (CAB) or building closer to a network terminal (CPE). The ODN is an active or passive network. The architecture further comprises at least one signalling coaxial or twisted wire pair line between the ONU or second Ethernet switch (ES) and one network terminal (CPE).

What particularly characterizes the powering system is that the ONU or the second ES is powered remotely from the central office (CO) via at least one powering twisted wire pair line extending between the central office (CO) and the cabinet (CAB) or building. At least one main power supply provided in the central office is adapted to power the ONU or the second ES.

In order to solve the above mentioned object the present invention finally relates to a cabinet (CAB) or building for a copper-centric fiber to the x (FTTX) architecture. The architecture comprises at least one point to point or point to multipoint optical distribution network (ODN) between an optical line termination (OLT) or first Ethernet Switch (ES) positioned at a central office (CO) and an optical network unit or second Ethernet switch (ES) positioned at the cabinet (CAB) or building closer to a network terminal (CPE). The ODN is an active or passive network. The architecture further comprises at least one signalling coaxial or twisted wire pair line between the ONU or second Ethernet switch (ES) and one network terminal (CPE).

What particularly characterizes the powering system is that the ONU or the second ES is powered remotely from the central office (CO) via at least one powering twisted wire pair line extending between the central office (CO) and the cabinet (CAB) or building. At least one main power supply provided in the central office is adapted to power the ONU or the second ES. At least one main power receiver provided in the cabinet (CAB) or building is adapted to receive the remote power.

The main advantage with the invention is that no additional power installation is necessary at the cabinet which results in capital expenditure CapEx savings. Furthermore, with the invention the ability to transport power in a particular twisted wire pair (such as a copper pair) is increased. The cabinet requirements can also be relaxed due to the need of less space, less generated heat and less powering (e.g. no cooling needed). Moreover, no truck roll is needed in case of dying gasp failure which results in operational expenditure savings OpEx. A final advantage is that the invention is technically possible and trivial.

BRIEF DESCRIPTION OF THE DRAWINGS

In the following text the invention will be described in detail with reference to the attached drawings. These drawings are used for illustration only and do not in any way limit the scope of the invention:

FIG. 3 shows a table with major Passive Optical Network (PON) technologies and some properties.

DETAILED DESCRIPTION

Figure 1:
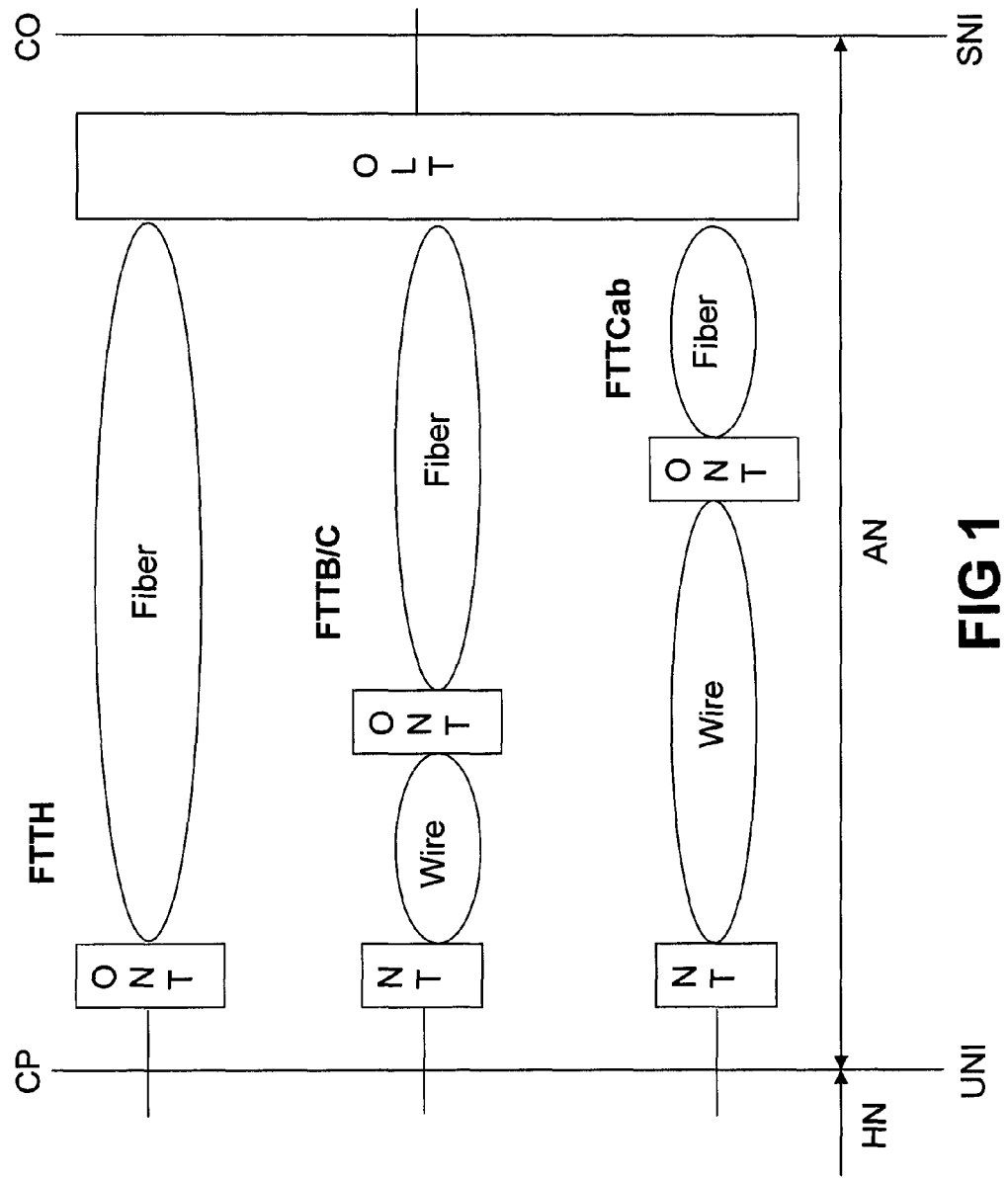
FIG. 1 shows the FTTx network architecture.

The invention will now be described in detail with reference to embodiments described in the detailed description and shown in the drawings.

The embodiment refers to a powering system for a copper-centric fiber to the x (FTTX) architecture. The method, the central office and the cabinet or building also included in the invention performs or is adapted to perform the powering as described in the embodiment. It should therefore be understood by a person skilled in the art that the embodiment therefore also discloses method, the central office and the cabinet or building.

Figure 4:
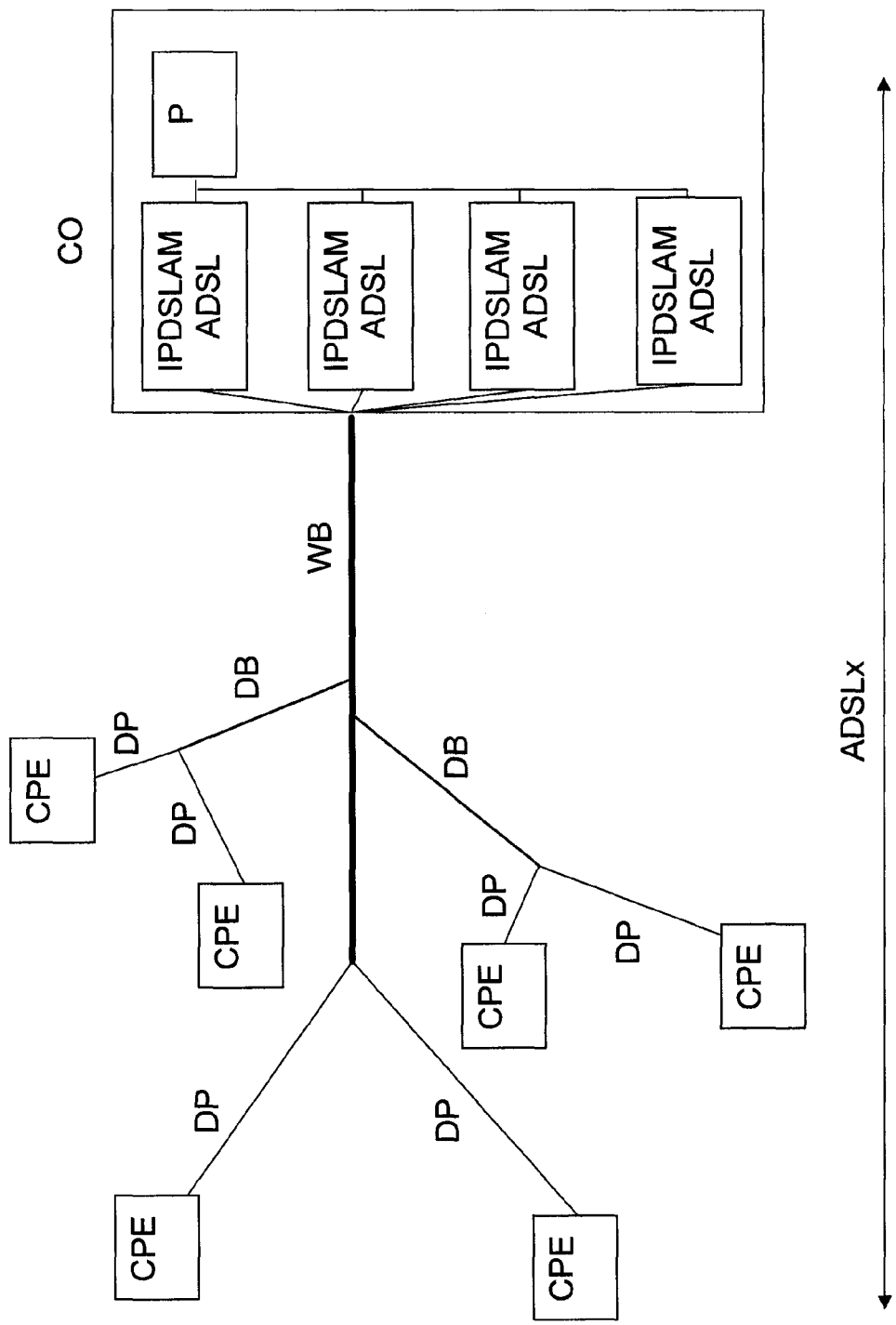
FIG. 4 shows a typical xDSL scenario.

FIG. 4 demonstrates a typical ADSLx scenario where twisted wire pair lines (twisted pair copper pairs) are used to transport data from the central office (CO) to the customer premises equipment (CPE). Large wire binders (WB) with high pair number (100-1000) are split in different locations in smaller drop binders (DB) that then fork out to different users with single or double cooper pairs, drop pairs (DP). In the central office there are several IPDSLAM and ADSL equipments. IPDSLAM stands for IP (Internet Protocol) DSL (Digital Subscriber Line) AM (Access Multiplexer) which is the term for the hardware providing xDSL services. Moreover, the central office is provided with a powering unit (P) for powering the equipment sending the wire signals.

The embodiment discloses a powering system for a copper-centric fiber to the x (FTTX) architecture. Such architecture comprises both a fiber and copper wire part. In particular the architecture comprises, see FIGS. 1-2, 5, at least one point to point or point to multipoint optical distribution network (ODN) 16 between an optical line termination (OLT) or first Ethernet Switch (ES) 10 positioned at a central office (CO) 11 and an optical network unit (ONU) or second Ethernet switch (ES) 15 positioned at a cabinet (CAB) or building 12 closer to a network terminal (CPE) 13. The ODN is an active or passive network.

The architecture further comprises at least one signalling coaxial or twisted wire pair line 14 between the ONU or second Ethernet switch (ES) 15 and one network terminal (CPE) 13. This is a drop binder (DB) plus a drop pair (DP), see FIGS. 4-5. The cabinet (CAB) or building 12 preferably at least further holding a coaxial or twisted wire loop connection panel and access multiplexer (not shown). Such a panel and multiplexer is for instance IPDSLAM (VDSL2 or ADSL2+).

The cabinet is for instance part of an FTTCab solution is chosen, wherein new small street-side cabinets (CAB) 12 are installed including the ONU. These cabinets typically hold the ONU (GPON) or Ethernet Switch (Active Ethernet) that terminates the fiber feed towards the central office and IPDSLAM (VDSL2 or ADSL2+) with a main distribution frame (MDF). This function as a copper connection panel and access multiplexer.

As mentioned in the background, powering an FTTCab solution is one of the main cost drivers for this kind of deployment options. Since a high number of cabinets need to be newly installed, power is mostly not available and need to be encompassed. The costs for cabinets including equipment and installation have to be traded-off against the gain that is achieved by re-using the copper in the very-last mile. Cabinet equipment also needs to be hardened (higher temperature range, no cooling). Thus low-cost cabinets are vital for FTTCab to be a successful option. The object of the present invention is therefore to provide a cost-efficient solution for powering FTTCab and FTTC that does not depend on local power resources.

Figure 5:
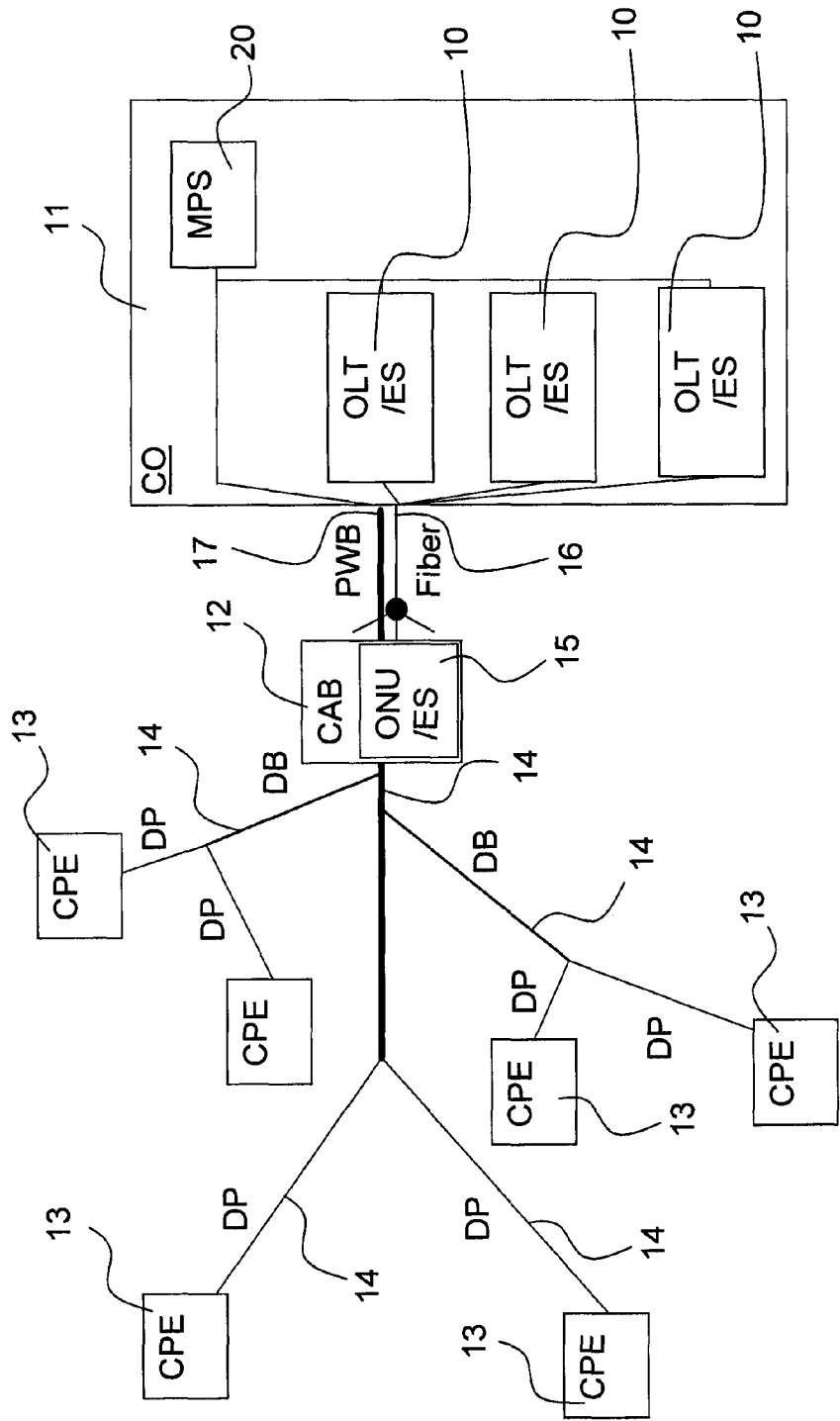
FIG. 5 shows a Fiber To The Cabinet (FTTCab) scenario with remote powering according to the invention.

This is solved by means of a power system particularly characterized in that, see FIG. 5, the ONU or the second ES is powered remotely from the central office (CO) 11 via at least one powering twisted wire pair line 17 extending between the central office (CO) and the cabinet (CAB) or building 12. The powering unit (P) is used for the purpose of remote powering and is at least connected to the powering twisted wire pair line or lines 17.

This powering twisted wire pair line 17 extends in a powering wire binder (PWB) as one of many wires. The powering wire binder comprises a number of twisted wire pair lines. The powering twisted wire pair line is commonly a copper wire pair.

The powering twisted wire pair line 17 and the signalling twisted wire pair line 14, now separated, earlier formed a single line for transporting data between the central office (CO) 11 and the network terminal (CPE) 13. The concept of remote powering is consequently to use the old copper binder piece WB, see FIGS. 4-5, between the central office (CO) and the cabinet for remote powering. The old copper wire binder, see FIG. 4, local loop is divided in to two parts: the part (PWB) from the central office (CO) to the cabinet (CAB) 12 (which always has to exist) is used to remotely power the active equipment in the cabinet from the central office, whereas the part from the cabinet to the user (CPE) is used to transport data, preferably via VDSL2.

Thus the old cooper is re-used in a twofold sense, both for remote powering and for data transmission over the very-last mile. As will be described, the more copper pairs are available in the powering wire binder (PWB), the more power can be transported.

No additional power installation in the cabinet is consequently needed, which results in CapEx savings. The cabinet requirements can also be relaxed due to the need of less space, less generated heat and less powering (e.g. no cooling needed). Moreover, no truck roll is needed in case of dying gasp failure which results in operational expenditure savings OpEx.

A number of powering twisted wire pair lines 17 together form a large binder, the powering wire binder (PWB), containing a high pair number of 100-1000 wire pair lines. Each wire is individually insulated and the wire pair lines being twisted or woven together. This is a so called Unshielded Twisted Pairs (UTP), traditionally used for telephony.

A small power analysis gives the impression of the feasibility of the remote powering scheme:
GPON ONT (SFU): data-only: 9 Watts, data+voice: 14 Watts.
IPDSLAM (12 lines) idle: 33 Watts idle, 39 Watts working.

This results in that a total power of 40 Watts is needed for 12 lines ad 70 Watts for 24 lines.

Figure 6:
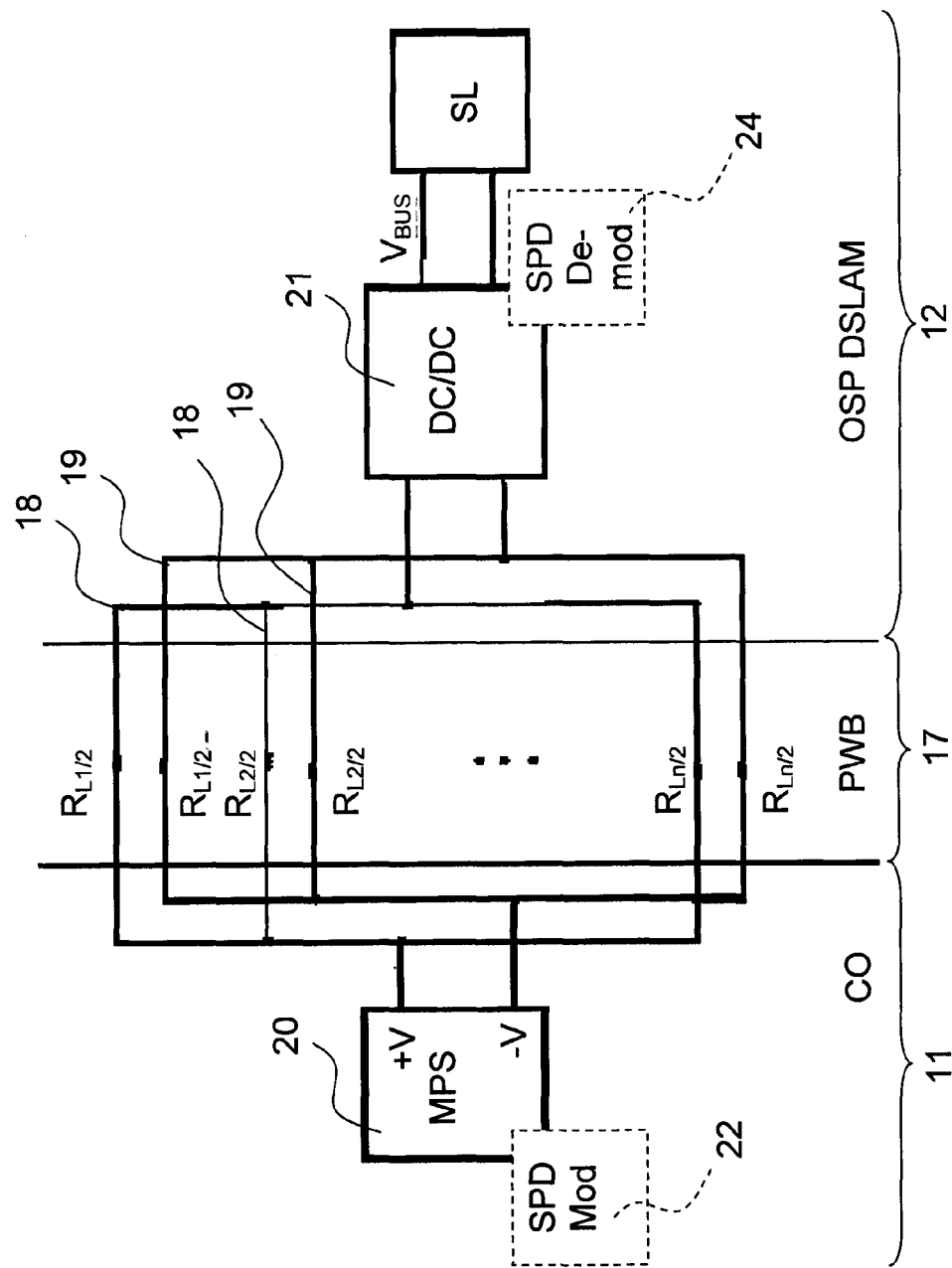
FIG. 6 shows an option for remote powering setup according to the invention.

FIG. 6 illustrates a circuit for remote powering. SL represents System Loads. The powering twisted wire pair line 17 (RL1/2) is fed by the central office (CO) 11 with a positive and/or corresponding negative voltage (V+/V−). FIG. 6 the remote powering setup is shown. At least one main power supply (MPS) 20 provided in the central office (CO) is adapted to power 28 the ONU or the second ES and at least one main power receiver (DC/DC) 21 provided in the cabinet (CAB) or building 12 is adapted to receive 29 the remote power.

With a circuit as depicted in FIG. 6, using positive and negative voltages, power levels on the order of 30-35 Watts per wire pair line 17 from a+/−130 Volt liner main power supply (MPS) 20 can be achieved.

As can also be seen in FIG. 5, a first wire 18 in each powering twisted wire pair line 17 are connected together and fed with a positive voltage and a second remaining wire 19 in each powering twisted wire pair line are connected together and fed with a negative voltage. This means that for low-cost circuit, at least two powering twisted wire pair lines 17 together feed power to the at least one ONU or second ES. This is simple way to increase the power level for remote powering.

With multiple wire pair lines 17 connected in parallel it is possible to achieve a sufficiently low resistance to enable the required power transfer. Such as setup only needs a single main power supply (MPS) 20 and a DC/DC unit (DC/DC). In case lines are used independently, this functionality has to be replicated.

For a perfectly matched and short loop with loop resistance Rl Ohms (typically 120 Ohms), the transferred power from a voltage source of Vs Volts (typically 130 Volts) is given by $Vs^2/(4Rl)=35$ W. For two twisted wire pair lines 17 in parallel, the Rl/2=60 Ohms will give 70 Watts in power for the remote node. This is more than enough to power a full equipped cabinet. Three twisted wire pair lines result in 105 Watts allowing for 24 VDSL2 lines.

In case the loops are taken from the same binder (PWB), resistance matching is not necessary since the loops (RL1-n) do have nearly the same length. Safety specifications place a 100-W limit on the CO-side power supply (MPS) 20 and a maximum of 60 mA through the local loop wires (RL). A Ground Fault Interrupter (GFI) circuit, which is usually required for safety compliance, is not shown in the figure, but should be used. A single DC/DC converter regulates a low-voltage bus, from which point-of-use regulators feed the system electronics.

From now on an improved method for remote powering will be described. Since the spectrum of the copper is not used for data transmissions anymore, it can be used to transport more power to the cabinet (CAB) 12 hosting the GPON ONU and/or the IPDSLAM. An improved way to solve this is that the main DC power supply (MPS) 20 is extended with a spectral-power-density (SPD) modulator (SPD Mod) 22, see FIG. 6, to fill the spectrum on the fiber accordingly. Thereby, the ability to transport power in particular in twisted wire pair lines 17 (such as a copper pair) is increased.

The simplest implementation for the SPD 22 is a pseudo-random noise (PRN) function or scrambler adapted to produce white noise with Gaussian-distributed amplitudes. The spectral power density for such a system is perfectly flat with maximum power content (P), see FIG. 7.

Figure 8:
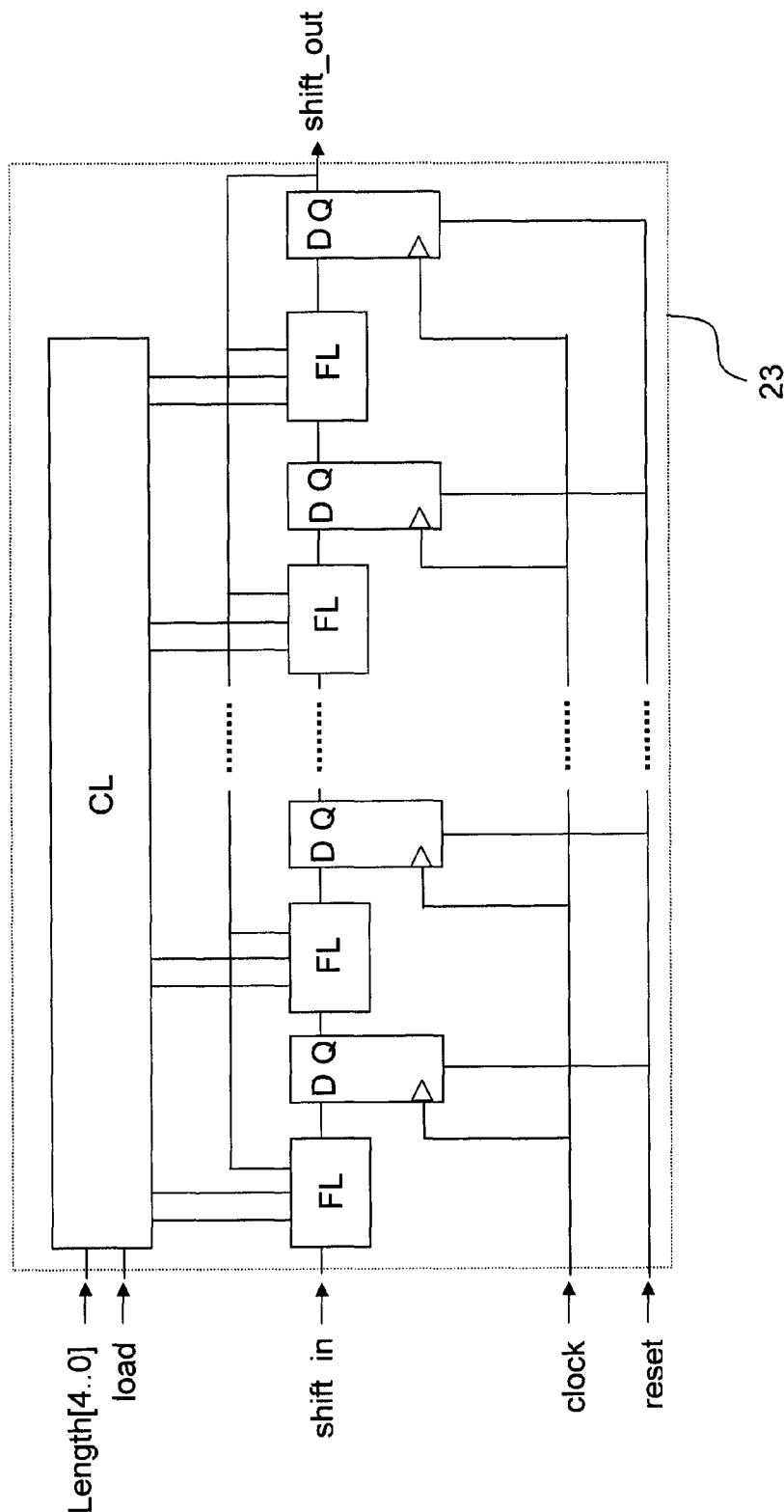
FIG. 8 shows a Linear Feedback Shift Register (LFSR) setup for implementing the SPD according to FIG. 10.

Preferably, a linear feedback shift registers (LFSR) 23 with primitive feedback polynomial is adapted to produce the PRN. An m-stage LFSR produces a periodical sequence of length $L=2^m$. The LFSR is shown in FIG. 8. These are the abbreviations in FIG. 8:
  CL—Configuration Logic
  FL—Feedback Logic If spectral limitation is needed, a low pass filter (LPF) 25, see FIG. 10, in the SPD modulator 22 is used and adapted to restrict the spectral band. An amplifier (AMP) 26 in the SPD modulator may also be used, and is adapted to amplify the spectral signal.

On the receiver side in the cabinet (CAB) 12, the main power receiver 21 is a SPD demodulator (SPD Demod) 24, see FIG. 6. The SPD demodulator is adapted to collect the spectral signal sent remotely from the SPD modulator 22 in the central office (CO) 11. When spectral filling is not used (low cost solution wire parallel wire pair lines) 17, the main power receiver is instead a DC-DC converter.

Figure 10:
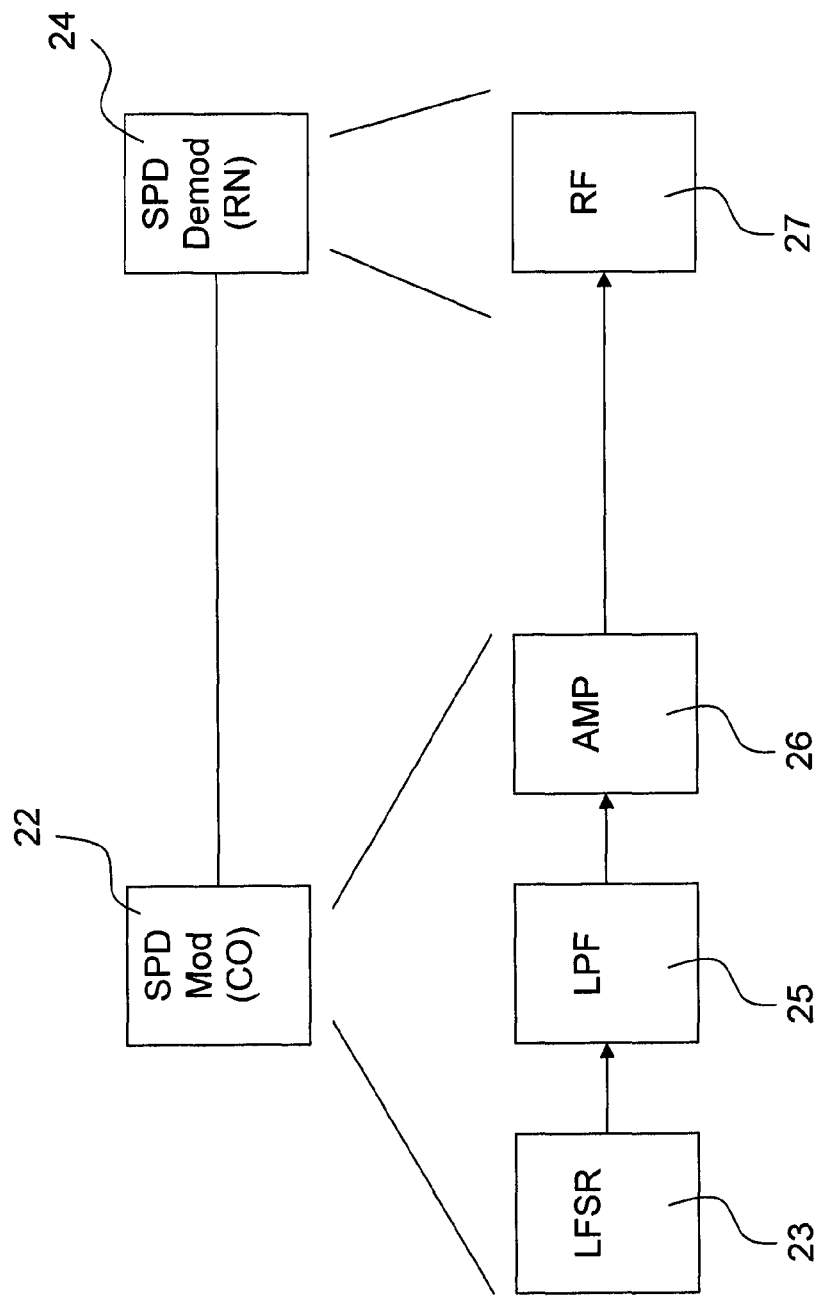
FIG. 10 shows a block diagram of the powering scheme.
Figure 11:
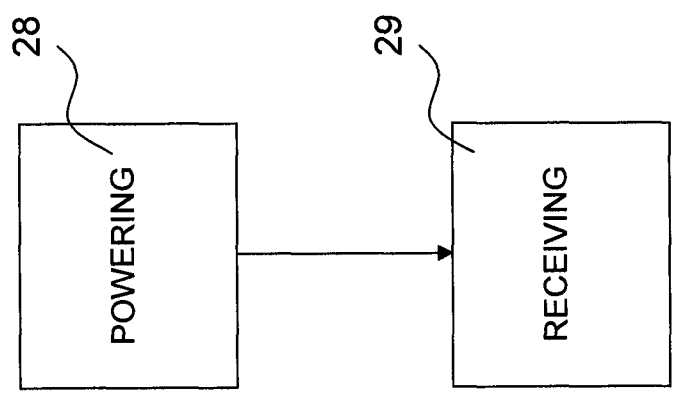
FIG. 11 shows the powering method steps according to one embodiment.

The total diagram of the overall scheme is shown in FIG. 10. The LFSR 23 produces a discrete Gaussian-white random sequence, the low pass filter (LPF) 25 restricts the band and the amplifier (AMP) 26 amplifies the signal up to the allowed safety limits. The LFSR 23, the filter 25 and the amplifier 26 are all in the Main Power Supply (MPS) 20 in the Central Office (CO) 11. A simple rectifier block (RF) 27 in the Main Power Receiver 21 is enough to collect the spectral content from the copper wire to be used for powering the remote equipment.

Figure 7:
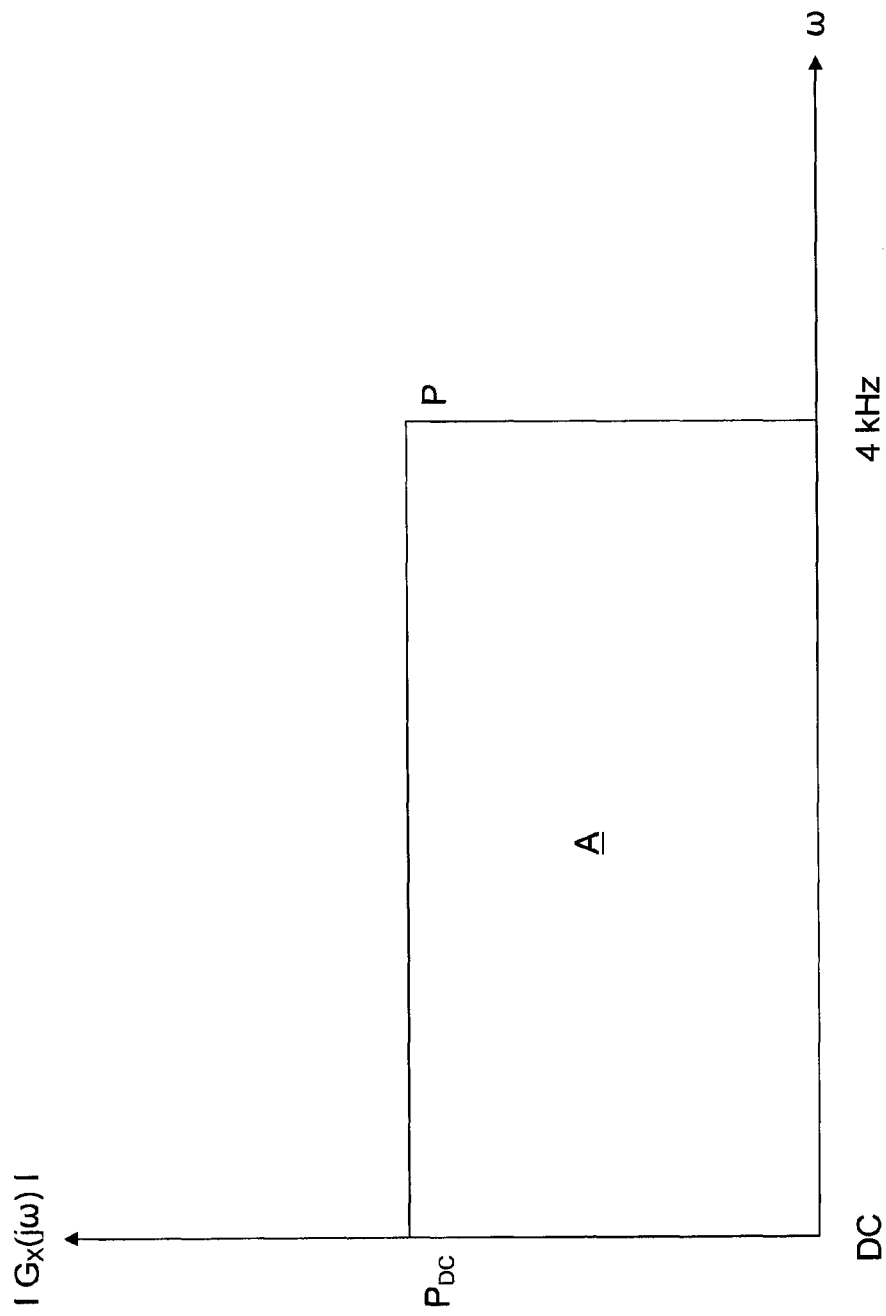
FIG. 7 shows an option of spectrum filling with a demodulator (SDP) technique for remote powering.

As shown in FIG. 7, the full spectrum (A) is used to transport power. The power is distributed with rectified AC. The power filling between DC and 4 kHz can be expressed in the following way:

$$\int_{DC}^{4kHz} |G_X(j\omega)| \cdot d\omega \gg P_{DC}$$

The sum (integral) over the power components (Gx) filled into the spectrum from 0 to 4 kHz, see FIG. 7, which gives the total transferred power (P) over the wire is larger than the power (Pdc) possible to transport via DC. The term "d" represents the differential operator, a very small step in omega, thus the integral represents the area under the curve of G(omega) over omega from 0 to 4 kHz.

Figure 9:
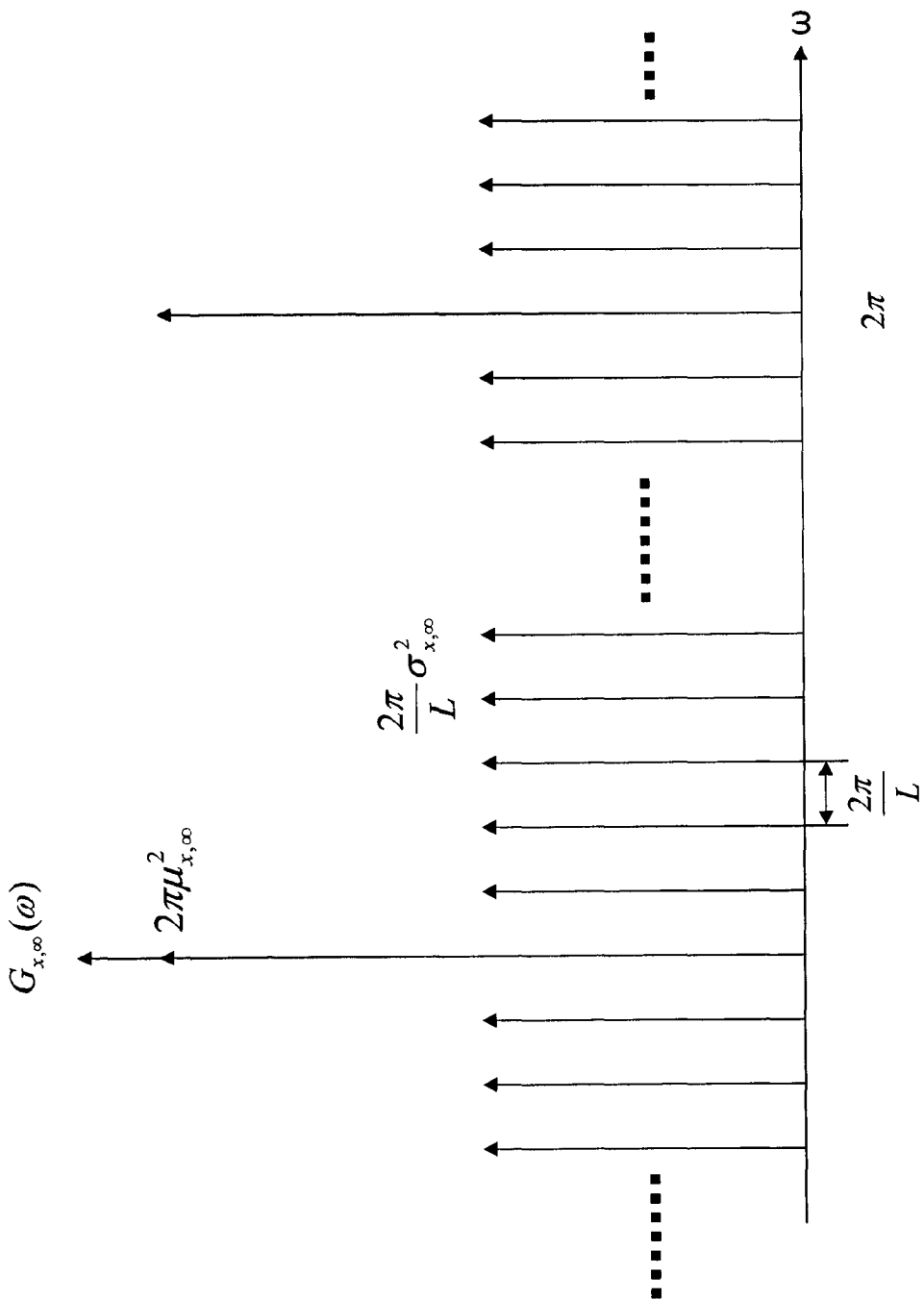
FIG. 9 shows the empirical spectral content of the shift_out signal.

The feedback logic implements the feedback polynomial which has to be primitive in order to generate an m-sequence (Galois LFSR). The empirical spectral content of the shift_out signal, see FIG. 8, is perfectly flat. This is shown also in FIG. 9. The spectral filing can be expressed in the following way:

$$G_{x,\infty}[\Theta] \approx \mu_{x,\infty}^2 2\pi \sum_{k=-\infty}^{\infty} \delta[\Theta - 2\pi k] x[k] + \sigma_{x,\infty}^2 \frac{2\pi}{L} \sum_{k=-\infty}^{\infty} \delta\left[\Theta - \frac{2\pi}{L} k\right]$$

The (discrete) power spectrum density (PSD) Gx at discrete frequency $\Theta=2\pi/k$ of the signal x(k) consist of power components of equal power content (delta-flat spectrum, second term) and a DC component (first term). In a pure DC scenario, the second term (which is adding the additional power transfer) would be missing. The term "L" represents the period length of the LFSR 23, see above. The term "K" is a counter variable while "$\delta$" is the so called delta-function, which is a peak around its argument. Finally "$\Theta$" is the discrete frequency.

If spectral limitation, the density can be filtered discretely with the low pass filter (LPF) 25 to fit the spectrum (e.g. 4 kHz):

$$y[n] = \sum_{k=-\infty}^{\infty} h[n-k]x[k]$$

The discrete filter with a low-pass impulse response h can be written as a finite impulse response filter (FIR) with x being the input signal from the LFSR 23 and y being the filtered output fitting the low-band (for example 4 kHz).

In a further embodiment a powering method for a copper-centric fiber to the x (FTTX) architecture is disclosed. The architecture comprises at least one point to point or point to multipoint optical distribution network (ODN) 16 between an optical line termination (OLT) or first Ethernet Switch (ES) 10 positioned at a central office (CO) 11 and an optical network unit (ONU) or second Ethernet switch (ES) 15 positioned at a cabinet (CAB) or building 12 closer to a network terminal (CPE) 13. The ODN is an active or passive network. The architecture further comprises at least one signalling coaxial or twisted wire pair line 14 between the ONU or second Ethernet switch (ES) 15 and one network terminal (CPE) 13.

In the method embodiment at least one main power supply (MPS) (20) provided in the central office (CO) (11) powers 28 the ONU or the second ES (15) remotely via at least one powering twisted wire pair line (17) extending between the central office (CO) (11) and the cabinet (CAB) or building (12). Furthermore at least one main power receiver (21) provided in the cabinet (CAB) or building (12) receives 29 the remote power.

Although GPON is presented in the detailed description it should be understood by a person skilled in the art that other PON can be used, such as EPON and BPON and whatever will follow in the future (next generation access systems). The present invention is further not limited to the embodiments described above and could be varied freely within the scope of the appended claims.

The invention claimed is:

1. A powering system for use in a copper-centric fiber to x (FTTX) architecture, the x (FTTX) architecture comprising:
   at least one point to point or point to multipoint optical distribution network (ODN) between an optical line termination (OLT) or first Ethernet Switch (ES) positioned at a central office (CO) and an optical network unit (ONU) or second Ethernet switch (ES) positioned at a cabinet (CAB) or building closer to a network terminal (CPE), the ODN being an active or passive network,
   at least one signalling coaxial or twisted wire pair line between the ONU or second Ethernet switch (ES) and one network terminal (CPE), and
   the ONU or the second ES being powered remotely from the central office (CO) via at least one powering twisted wire pair line extending between the central office (CO) and the cabinet (CAB) or building, and
   the powering system comprising:
      at least one main power supply (MPS) provided in the central office (CO) which is configured to remotely power the ONU or the second ES via the at least one powering twisted wire pair line extending between the central office (CO) and the cabinet (CAB) or building:
      at least one main power receiver provided in the cabinet (CAB) or building which is configured to receive the remote power via the at least one powering twisted wire pair line extending between the central office (CO) and the cabinet (CAB) or building; and
      wherein the main power supply (MPS) is extended with a spectral-power-density (SPD) modulator.

2. The powering system according to claim 1, wherein a number of powering twisted wire pair lines together form a large binder (PWB) containing a high pair number of 100-1000 wire pair lines, each wire being individually insulated and the wire pair lines being twisted or woven together.

3. The powering system according to claim 1, wherein the powering twisted wire pair line is fed by the central office (CO) with at least one of a positive and a corresponding negative voltage.

4. The powering system according to claim 3, wherein a first wire in each powering twisted wire pair line are connected together and fed with a positive or zero voltage and a second remaining wire in each powering twisted pair line are connected together and fed with a negative voltage.

5. The powering system according to claim 4, wherein at least two powering twisted wire pair lines together feed power to the at least one ONU or second ES.

6. The powering system according to claim 1 wherein the SPD is a pseudo-random noise (PRN) function or scrambler adapted to produce white noise with Gaussian-distributed amplitudes.

7. The powering system according to claim 6, wherein a linear feedback shift registers (LFSR) with primitive feedback polynomial is adapted to produce the PRN.

8. The powering system according to claim 1 wherein a low pass filter (LPF) in the SPD modulator is adapted to restrict the spectral band.

9. The powering system according to claim 1 wherein an amplifier (AMP) in the SPD modulator is adapted to amplify the spectral signal.

10. The powering system according to claim 1, wherein the main power receiver is a SPD demodulator.

11. The powering system according to claim 10, wherein a rectifier (RF) in the SPD demodulator is adapted to collect the spectral signal.

12. The powering system according to claim 1, wherein the main power receiver is a DC-DC converter.

13. The powering system according to claim 2 wherein the wire is a copper wire.

14. A powering method for use in a copper-centric fiber to x (FTTX) architecture, the x (FTTX) architecture comprising:
at least one point to point or point to multipoint optical distribution network (OON) between an optical line termination (OLT) or first Ethernet Switch (ES) positioned at a central office (CO) and an optical network unit (ONU) or second Ethernet switch (ES) positioned at a cabinet (CAB) or building closer to a network terminal (CPE), the OON being an active or passive network,
at least one signalling coaxial or twisted wire pair line between the ONU or second Ethernet switch (ES) and one network terminal (CPE), and
the ONU or the second ES being powered remotely from the central office (CO) via at least one powering twisted wire pair line extending between the central office (CO) and the cabinet (CAB) or building; and
the powering method comprising the steps of:
providing, in the central office (CO), at least one main power supply (MPS) which is configured to remotely power the ONU or the second ES via the at least one powering twisted wire pair line extending between the central office (CO) and the cabinet (CAB) or building;
providing, in the cabinet (CAB) or building, at least one main power receiver which is configured to receive the remote power via the at least one powering twisted wire pair line extending between the central office (CO) and the cabinet (CAB) or building; and
wherein the main power supply (MPS) is extended with a spectral-power-density (SPD) modulator.

15. The powering method according to claim 14 wherein the SPD is a pseudorandom noise (PRN) function or scrambler producing white noise with Gaussian-distributed amplitudes.

16. The powering method according to claim 15 wherein a linear feedback shift registers (LFSR) with primitive feedback polynomial produces the PRN.

17. The powering method according to claim 14, wherein a low pass filter (LPF) in the SPD modulator restricts the spectral band.

18. The powering method according to claim 14, wherein an amplifier (AMP) in the SPD modulator amplifies the spectral signal.

19. The powering method according to claim 14, wherein the main power receiver is a SPD demodulator.

20. The powering method according to claim 19, wherein a rectifier (RF) in the SPD demodulator collects the spectral signal.

21. A central office (CO) for use in a copper-centric fiber to x (FTTX) architecture, the x (FTTX) architecture comprising:
at least one point to point or point to multipoint optical distribution network (OON) between an optical line termination (OLT) or first Ethernet Switch (ES) positioned at the central office (CO) and an optical network unit (ONU) or second Ethernet switch (ES) positioned at a cabinet (CAB) or building closer to a network terminal (CPE), the ODN being an active or passive network,
at least one signalling coaxial or twisted wire pair line between the ONU or second Ethernet switch (ES) and one network terminal (CPE),
the ONU or the second ES being powered remotely from the central office (CO) via at least one powering twisted wire pair line extending between the central office (CO) and the cabinet (CAB) or building: and
the central office (CO) comprising:
at least one main power supply (MPS) which is configured to remotely power the ONU or the second ES via the at least one powering twisted wire pair line extending between the central office (CO) and the cabinet (CAB) or building; and
wherein the main power supply (MPS) is extended with a spectral-power-density (SPD) modulator.

22. A cabinet (CAB) or building for use in a copper-centric fiber to x (FTTX) architecture, the x (FTTX) architecture comprising:
at least one point to point or point to multipoint optical distribution network (OON) between an optical line termination (OLT) or first Ethernet Switch (ES) positioned at a central office (CO) and an optical network unit (ONU) or second Ethernet switch (ES) positioned at the cabinet (CAB) or building closer to a network terminal (CPE), the ODN being an active or passive network,
at least one signalling coaxial or twisted were pair line between the ONU or second Ethernet switch (ES) and one network terminal (CPE), and
the ONU or the second ES being powered remotely from the central office (CO) via at least one powering twisted wire pair line extending between the central office (CO) and the cabinet (CAB) or building, and
the cabinet (CAB) or building comprising:
at least one main power receiver which is configured to receive the remote power via the at least one powering twisted wire pair line extending between the central office (CO) and the cabinet (CAB) or building; and
wherein the main power supply receiver is a spectral-power-density (SPD) demodulator.

* * * * *

UNITED STATES PATENT AND TRADEMARK OFFICE
CERTIFICATE OF CORRECTION

PATENT NO. : 8,483,561 B2
APPLICATION NO. : 12/867099
DATED : July 9, 2013
INVENTOR(S) : Trojer It is certified that error appears in the above-identified patent and that said Letters Patent is hereby corrected as shown below:

On the Title Page, Item (56), under "OTHER PUBLICATIONS", in Column 2,
Line 1, delete "al:" and insert -- al., --, therefor.

On the Title Page, Item (56), under "OTHER PUBLICATIONS", in Column 2,
Line 2, delete "service.""" and insert -- services." --, therefor.

On Title Page 2, Item (56), under "OTHER PUBLICATIONS", in Column 2, Line 1,
delete "al." and insert -- al., --, therefor.

Figure 2:
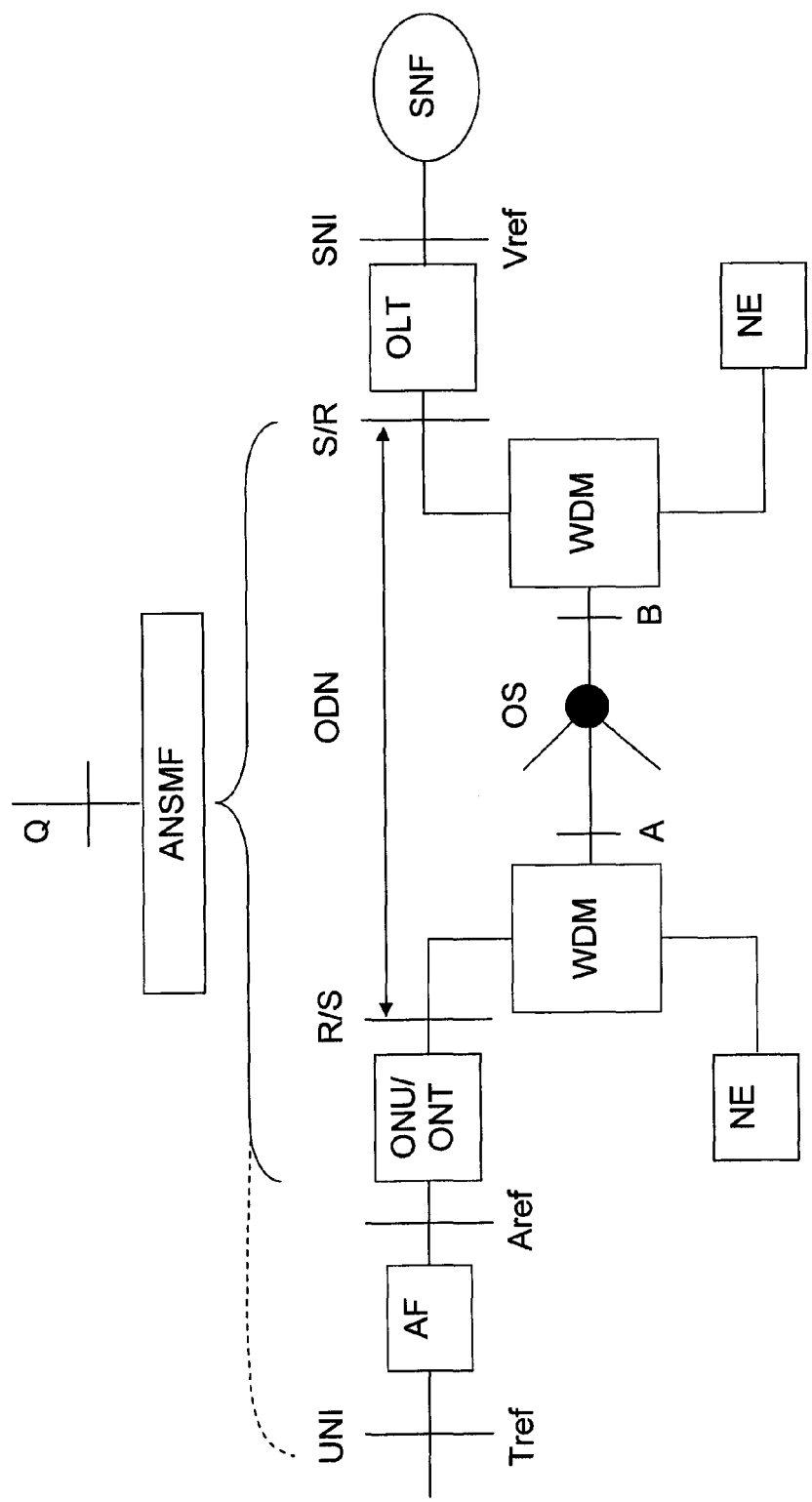
FIG. 2 shows the reference configuration for a Gigabit Passive Optical Network (GPON).

In the Drawings:

In Fig. 1, Sheet 1 of 11, delete "Fig" and insert -- Fig. --, therefor at each occurrence throughout the drawings.

In the Specifications:

In Column 3, Line 4, delete "PONS" and insert -- PONs --, therefor.

In Column 3, Line 26, delete "Function" and insert -- Function. --, therefor.

In Column 3, Line 35, delete "PONS." and insert -- PONs. --, therefor.

In the Claims:

In Column 10, Line 43, in Claim 1, delete "building:" and insert -- building; --, therefor.

In Column 11, Line 22, in Claim 13, delete "claim 2" and insert -- claim 2, --, therefor.

In Column 11, Line 28, in Claim 14, delete "(OON)" and insert -- (ODN) --, therefor.

Signed and Sealed this
Third Day of December, 2013

Margaret A. Focarino
*Commissioner for Patents of the United States Patent and Trademark Office*

CERTIFICATE OF CORRECTION (continued)
U.S. Pat. No. 8,483,561 B2

In Column 11, Line 33, in Claim 14, delete "OON" and insert -- ODN --, therefor.

In Column 12, Line 15, in Claim 21, delete "(OON)" and insert -- (ODN) --, therefor.

In Column 12, Line 27, in Claim 24, delete "building:" and insert -- building; --, therefor.

In Column 12, Line 40, in Claim 22, delete "(OON)" and insert -- (ODN) --, therefor.

In Column 12, Line 46, in Claim 22, delete "were" and insert -- wire --, therefor.